Aug. 11, 1925.

J. A. COSTELLO

1,549,066

FAUCET

Filed Feb. 6, 1925   2 Sheets-Sheet 1

Inventor:
Joseph A. Costello
By (signature)
his Attorney.

Patented Aug. 11, 1925.

1,549,066

UNITED STATES PATENT OFFICE.

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO.

FAUCET.

Application filed February 6, 1925. Serial No. 7,285.

*To all whom it may concern:*

Be it known that I, JOSEPH A. COSTELLO, a citizen of the United States, residing at Cleveland, in the county of Cuyahoga and State of Ohio, have invented a new and useful Faucet, of which the following is a specification.

This invention relates to improvements in faucets and more especially to a faucet adapted for use in connection with an oil-tank wagon and comprising a casing which has an interior chamber having an outlet communication which is controlled by a valve arranged to move in said chamber in opening and engaged by resilient means acting to retain the valve in its closed position.

Said valve is operatively connected with a shaft supported from the hereinbefore mentioned casing, and one object of this invention is to devise improved simple, convenient and reliable means whereby movement of the valve from its closed position into an open position occurs during rotation of said shaft in one direction and rotation of the shaft in the opposite direction occurs during movement of the valve into its closed position.

Another object is to produce a faucet of the character indicated which comprises improved means whereby, in the closed position of the valve, vibration of the valve is positively prevented and the shaft is held, independent of the hereinbefore mentioned resilient means, against rotation in the direction required to open the valve.

Another object is to provide the hereinbefore mentioned casing with a screw which is not only moved endwise in the one direction or the other according as the screw is rotated in the one or other direction but arranged to be brought into such pressure-exerting relation to an arm of the shaft, when the valve is closed, as to cause said screw and said shaft-arm to cooperate in preventing rotation of the shaft in the direction required to open the valve.

Another object is to render said shaft-arm and said screw utilizable in preventing rotation of the shaft in the direction required to close the valve when the valve has been actuated into an open position against the action of the hereinbefore mentioned resilient means.

Another object is to provide means for protecting adjacent portions of said screw and said shaft-arm against injury.

Another object is not only to have said screw capable of endwise movement into contact with said shaft-arm by the required rotation of the screw after movement of the valve from an open position into its closed position and to cause said screw and said shaft-arm to be relatively arranged as required for cooperation in preventing rotation of the shaft in the direction required to open the valve after said movement of the screw into said contact with said arm, but to provide simple and highly practical means whereby said screw, when the screw is in said contact with said arm, may be locked against rotation in the direction required to withdraw the screw from said arm.

Said shaft-arm is preferably formed by a metal piece mounted and slid endwise into the required place on the shaft and secured to the shaft by a pin, and another object is to provide means whereby said arm, were said pin removed in the closed position of the valve, would still be prevented from movement endwise of the shaft out of operative relation to said arm.

Another object is to facilitate the manufacture and assemblage of the component parts of my improved faucet, and to render the faucet highly practical and convenient, and simple and durable in construction.

With these objects in view, and to attain other objects hereinafter appearing, this invention consists in certain features of construction, and combinations and relative arrangements of parts, hereinafter described in this specification, pointed out in the claims, and illustrated in the accompanying drawings.

In said drawings.

Referring to said drawings, 16 (see Figs. 1 and 3) indicates a metal casing having an interior chamber 17 and comprising an integral spout or tubular member 18 arranged below said chamber and forming the fluid-outlet of the chamber. The casing 16 (see Figs. 2 and 3) is provided, at the rear of the chamber 17, with a rearwardly projecting internally screw-threaded tubular member 19 which forms the fluid-inlet of said chamber and is adapted to be screwed onto a tank-wagon pipe or other supply pipe or tubular member (not shown). The upper portion of the outlet-member 18 is externally provided, at the front of said member, with a forwardly projecting hook 20 on which may be hung a bucket or receptacle not shown.

Figure 1:
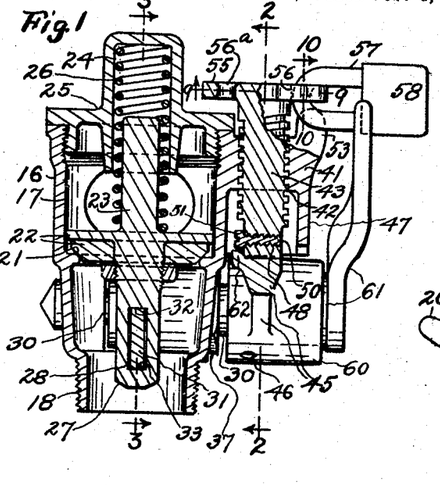
Figure 1 is a front elevation, largely in section, of a faucet embodying my invention.
Figures 3, 4, 5, 6, 7, 8:
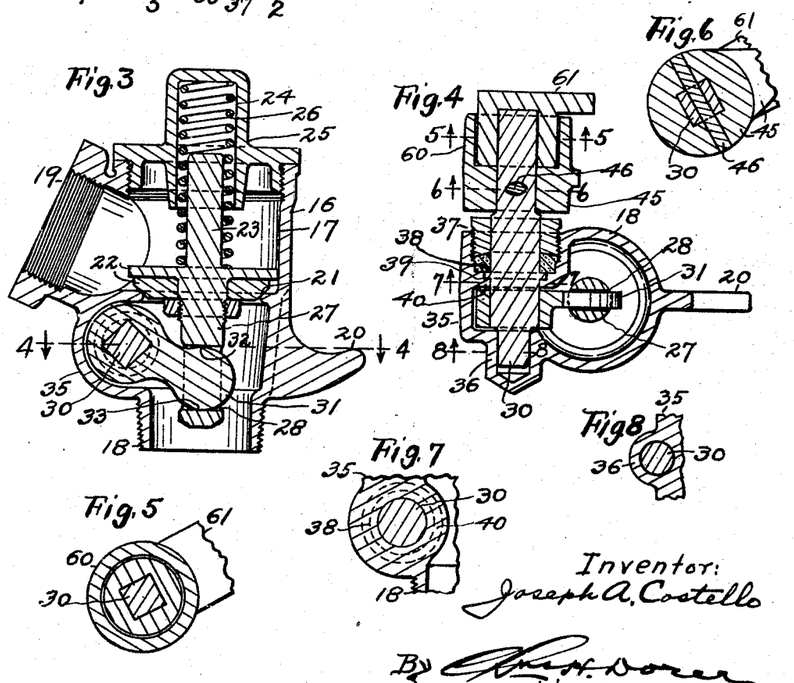
Fig. 4 is a horizontal section taken along line 4—4 in Fig. 3, looking downwardly.
Figs. 5, 6, 7 and 8 are vertical sections taken along line 5—5, line 6—6, line 7—7 and line 8—8, respectively, in Fig. 4, looking in the direction indicated by the arrows.
Figure 9:
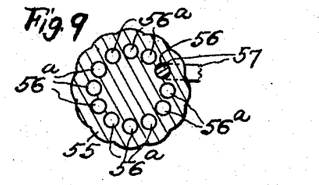
Fig. 9 is a horizontal section taken along line 9—9 in Fig. 1, looking upwardly.
Figure 10:
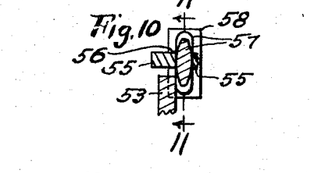
Fig. 10 is a vertical section, in detail, taken along line 10—10 in Fig. 1, looking outwardly.
Figure 11:
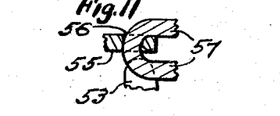
Fig. 11 is a vertical section taken along line 11—11 in Fig. 10, looking in the direction indicated by the arrows.

The casing 16 (see Figs. 1 and 3) is provided internally, at the upper end of the outlet-member 18, with an upwardly facing annular valve-seat 21, and said outlet-member is arranged to communicate, at its upper end, with the chamber 17 in the open position of a valve 22 which is formed in any approved manner and arranged to control communication between said chamber and said outlet-member and engages the seat 21 when the valve is closed, as shown in Figs. 1 and 3. Said valve is arranged to move upwardly in said chamber in opening, and obviously said chamber discharges into the outlet-member 18 when the valve is open. Said valve comprises a substantially vertically upwardly projecting rigid stem 23 which extends into a chamber 24 formed internally of the central portion of an externally screw-threaded metal bonnet 25 screwed into the upper end portion of and therefore removable from the casing 16. A coiled spring 26 is coiled around the stem 23 and confined between the valve 22 and the upper end wall of the chamber 24 and acts to retain the valve in its closed position.

The valve 22 (see Figs. 1, 3 and 4) comprises a substantially vertically downwardly projecting stem 27 arranged internally and centrally of the outlet-member 18 of the casing, and said stem has an aperture 28 which extends substantially horizontally from the front to the rear of said stem and therefore transversely of and through the stem and is engaged by a forwardly projecting arm 31 of a substantially horizontal shaft 30 shown arranged substantially at a right angle to and rearward of said stem and supported from the casing. The aperture 28 has a top wall 32 and a bottom wall 33, and said walls are engaged by the shaft-arm 31 in the closed position of the valve. The upper portion of the outlet-member 18 of the casing is enlarged rearwardly, as at 35, and said enlargement 35 extends circumferentially of the adjacent portion of the shaft 30. The left-hand end portion of said shaft (see Fig. 4) is arranged within the portion 35 of the casing, and said portion of the casing, (see Figs. 4 and 8) is formed and contoured at the left-hand side of the shaft-arm 31 as required to enclose the left-hand end of the shaft and to form a bearing 36 for said shaft at said side of and in proximity to said arm.

Adjacent the opposite or right-hand side of the shaft-arm 31 (see Fig. 4) is a stuffing-box 37 formed around the shaft 30 in any approved manner, and said shaft extends through said box and outwardly from the right-hand or outer end of said box. The shaft 30 (see Figs. 4 and 7) is provided, between the arm 31 and the inner end of the stuffing-box 37, with an external annular flange or collar 38 which is spaced from the last-mentioned side of said arm and abuts against a shoulder 39 formed internally of the portion 35 of the casing and facing in the direction of the right-hand end of the shaft and cooperating with said collar in preventing endwise displacement of the shaft in the opposite direction. The portion 35 of the casing is formed and contoured internally, between said collar and the shaft-arm 31, as required to form a bearing 40 for said shaft in proximity to the right-hand side of said arm. It will be observed, therefore, that the shaft 30 is circular in cross-section between the outer extremity of the stuffing-box 37 and the right-hand side of the shaft-arm 31, as shown in Fig. 7, and between the left-hand side of said arm and the left-hand extremity of the shaft, as shown in Fig. 8, and preferably the shaft has its portion which extends from side to side of said arm angular in cross-section, as shown in Fig. 3, and said arm preferably consists of a single metal piece which is mounted on and conforms to said angular portion of the shaft.

The aperture 28 in the lower valve-stem 27, the shaft-arm 31, and the portion 35 of the casing are relatively arranged and contoured as required to permit actuation of said stem and connected valve by said arm during the required rotation of the shaft, and it will be observed that said arm and the top and bottom walls of said aperture constitute means whereby movement of the valve from its closed position into an open position occurs during rotation of the shaft in one direction and rotation of the shaft in the opposite direction occurs during movement of the valve into its closed position.

The casing 16 (see Figs. 1 and 2) comprises a lug 41 formed at the upper end of the rght-hand side and externally of the casing, and said lug is spaced upwardly from the outlet of the chamber 17 and has a screw-threaded hole 42 extending substantially vertically through the lug and uniform in diameter from end to end and engaged by an upright external screw 43 which is arranged externally of said chamber and screwed at said hole into and extends through and above and below said lug. The lug 41 therefore forms an upright internal screw engaged by the external screw 43 which is moved endwise upwardly or downwardly according as it is rotated in the one or the other direction.

The shaft 30 (see Figs. 2, 5 and 6) has its portion which extends from the right-hand extremity of the shaft to a point near the stuffing-box 37 angular in cross-section, and said angular portion of the shaft is provided, adjacent said stuffing-box, with an arm 45 arranged (see Figs. 1, 2 and 4) at the right-hand side of and externally of the casing 16 and adapted to be employed, as will hereinafter more fully appear, in holding the shaft against rotation in the direction required to actuate the valve into an open position from its closed position shown in Figs. 1 and 3, and preferably said arm consists of a metal piece mounted on and conforming to said angular portion of the shaft and slid into place on the shaft from the right-hand end of the shaft and fastened to the shaft by a suitably applied pin 46, as shown in Fig. 6.

The shaft 30 and the external screw 43 (see Figs. 1 and 2) are arranged substantially at a right angle to each other, and the relative arrangement of the parts is preferably such that said shaft is lower than and rearward of said screw and extends from side to side of the casing 16, that the shaft-arm 45, in the closed position of the valve, (see Figs. 1 and 2) projects forwardly and upwardly and extends under and opposite the lower end face of said screw, and that said arm is spaced downwardly from the member 41 in any position of said arm.

Figure 2:
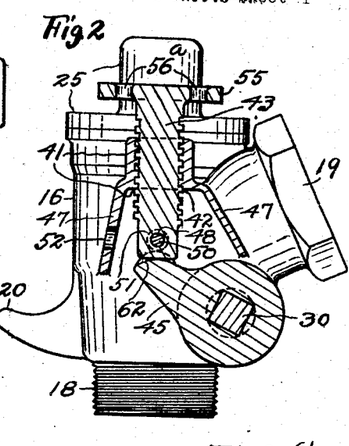
Figs. 2 and 3 are vertical sections taken along line 2—2 and line 3—3, respectively, in Fig. 1, looking in the direction indicated by the arrows.

In Figs. 1 and 2 the external screw 43 is shown as extending into the path of the shaft-arm 45 and in position with its lower end face over and in contact with the forward or outer end portion of said arm in the closed position of the valve, and obviously said screw is actuated out of the path of said arm, if not already out of said path, before movement of the valve from an open position into its closed position, and said screw, after the valve has moved from an open position into its closed position, is rotated in the direction and to the extent required to bring the screw into pressure-exerting relation to said arm, as shown in Figs. 1 and 2.

The relative arrangement of parts is such that the shaft-arm 45 and the screw 43, after movement of said screw into contact with said arm in the closed position of the valve, are arranged to cooperate in preventing rotation of the shaft in the direction required to open the valve, and that the hereinbefore mentioned shaft-arm 31, when said screw is in pressure-exerting relation to the shaft-arm 45 in the closed position of the valve, cooperates with the bottom wall 33 of the aperture 28 in holding the valve in pressure-exerting relation to the valve-seat 21 so that, in said closed position of the valve, vibration of the valve is positively prevented and the shaft is held, independent of the spring 26, against rotation.

The casing 16 (see Figs. 1 and 2) comprises an apron 47 extending downwardly from and rigid with the member 41 and preferably integral with the casing, and said apron is arranged externally of the path of the shaft-arm 45 and extends downwardly from said member 41 and circumferentially of the lower portion of the screw 43. Said apron preferably extends opposite the right-hand side of the screw 43, as shown in Fig. 1, and rearward and forward of said said screw, as shown in Fig. 2, and is arranged to adequately shield the adjacent portion of said screw when the screw is in contact with the shaft-arm 45 in the closed position of the valve.

The screw 43, in its uppermost position, (see Fig. 12) extends below the member 41. The lower end portion of the screw 43 has a screw-threaded radial hole 48 extending (see Fig. 1) laterally through the screw and engaged by a correspondingly externally threaded pin 50 which is spaced downwardly from the member 41 when the screw 43 (see Figs. 1 and 2) is in the position in which it makes contact with the shaft-arm 45 in the closed position of the valve. One end of said pin 50 (see Fig. 1) is arranged to form a shoulder 51 externally of the screw 43. The lower end face of the member 41 and the shoulder 51 are arranged to cooperate in limiting upward movement of the screw 43.

The apron 47, at its forward side, (see Fig. 2) has a hole 52 which is opposite the forward side of and radial in relation to the screw 43 and larger diametrically than the pin 50 so as to permit the passage of said pin through said hole and into the hole 48 in said screw after positioning said screw as required to cause the hole 48 to register with the hole 52 during the assemblage of the parts. The relative arrangement of the parts is such that the pin 50 is out of registering relation with and at an angle to the hole 52 when the screw 43 is in contact with the shaft-arm 45 in the closed position of the valve, and obviously, therefore, said pin is not accessible through said hole in the pressure-exerting relation of said screw to said arm in said position of the valve, so that said pin cannot be removed when said screw is locked in contact with said arm in said position of the valve. Of course, the pin 50 is adapted to be brought into registering relation to the hole 52 by the required rotation of the screw when the screw is not locked against rotation in the direction required to withdraw the screw from the shaft-arm 45 in the closed position of the valve.

Figure 12:
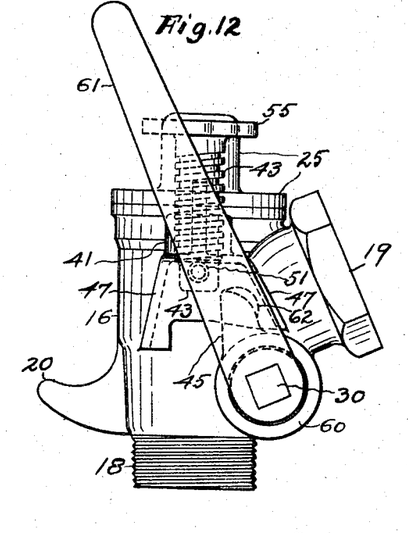
Fig. 12 is a right-hand side elevation and shows the hereinafter described screw 43 as raised from its position shown in Fig. 2 far enough to permit movement of the hereinafter described shaft-arm 45 from the position shown in Fig. 2 into a position rearward of said screw as shown in broken lines in Fig. 12.
Figure 13:
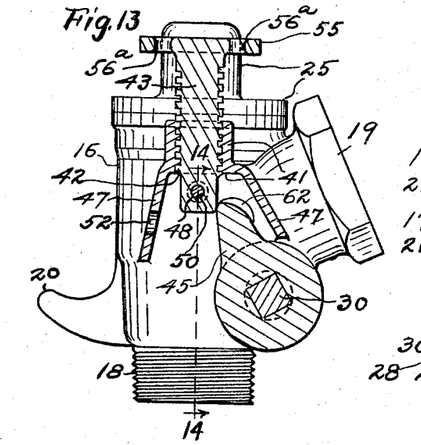
Fig. 13 is a right-hand side view, largely in vertical section, and shows the screw 43 lowered from the position shown in Fig. 12 into a position in front of the shaft-arm 45 when said arm has been actuated into the position shown in Fig. 12.
Figure 14:
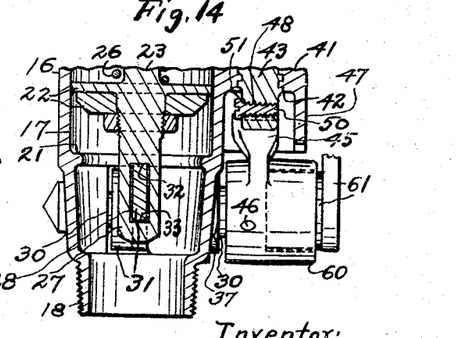
Fig. 14 is a vertical section taken along line 14—14 in Fig. 13, looking rearwardly.

My invention also comprises highly practical simple locking means employed in locking the screw 43, when said screw is in pressure-exerting relation to the shaft-arm 45 in the closed position of the valve, against rotation in the direction required to withdraw the screw from said arm, and said screw is long enough to extend above the member 41 when in contact with said arm in the closed position of the valve. Said locking means (see Figs. 1, 10 and 11) preferably comprise a flange 53 formed on the member 41 and a hand-wheel-forming head 55 which is formed on the upper end of the screw 43 and has a hole 56 extending vertically through the head and arranged adjacent said flange when said screw 43 is in contact with the shaft-arm 45 in the closed position of the valve. The flange 53 projects upwardly from the member 41 and is arranged at the right-hand side of the screw 43. The head 55 is higher than said flange. The hole 56 is adapted to receive the bow 57 of a padlock 58 only shown applied in Figs. 1, 9, 10 and 11, and the flange 53 is arranged as required for cooperation with said bow 57 in preventing rotation of the screw 43 in the direction required to withdraw said screw from the shaft-arm 45 in the closed position of the valve. The hole 56 is one of a series of holes the remainder of which are indicated by the reference-character 56ª in Figs. 1, 2, 9 and 13, and the holes of said series of holes are spaced substantially equidistantly from and substantially equidistantly circumferentially of the axis of the screw 43. Obviously the removal of the padlock 58, when said padlock has been applied as shown in Figs. 1, 9, 10 and 11 in the closed position of the valve, is required to render the screw 43 free to be rotated in the direction required to withdraw said screw from the shaft-arm 45 the distance necessary to permit rotation of the screw in the direction and to the extent required to elevate or remove the screw out of the path of said arm. In Fig. 12 the screw 43 is shown as having been elevated out of the path of the shaft-arm 45, and the shaft 30 is shown as having been rotated in the direction and to the extent required to bring said arm rearward of the screw. When the valve is to be held open for a considerable flow of liquid through the faucet and longer than would be convenient for manually holding the valve in open position against the action of the spring 26, the shaft 30, after it has been rotated in the direction and to the extent required to bring the arm 45 into position rearward of the screw 43, as shown in Fig. 12, is manually held with said arm in said position long enough to permit rotation of said screw in the direction and to the extent required to lower said screw in front of said arm, as shown in Figs. 13 and 14, so as to cause said arm to be held in said position by said screw as long as desired, and so that said screw and said arm, when they are in the position shown in Figs. 13 and 14 in the open position of the valve, are arranged to cooperate in retaining said valve in said open position until said screw is again rotated in the direction and to the extent required to effect a withdrawal of said screw upwardly out of the path of said arm, and obviously said withdrawal of said screw out of said path renders the valve subject to the action of the spring 26 which is powerful enough to actuate the valve into its closed position shown in Figs. 1 and 3 and thereby effect the rotation of the shaft 30 in the direction and to the extent required to move its arm 45 from the position shown in Fig. 13 into the position shown in Figs. 1 and 2. I would here remark that the rear portion of the apron 47 is spaced rearwardly from the path of the screw 43 the distance required to permit movement of the shaft-arm 45 into position at the rear of said path, as shown in Figs. 13 and 14.

The shaft-surrounding part of the shaft-arm 45 (see Figs. 4 and 5) has a socket-forming portion 60 between the pin 46 and the adjacent extremity of the shaft 30, and said socket-forming portion is substantially concentric in relation to the shaft and adapted to accommodate the application, to the shaft, of a wrench or crank 61 for operating the shaft.

The shaft-arm 45 (see Figs. 1 and 2) is provided, at its outer end portion and left-hand side, with a lug 62 arranged to overlap the left-hand side of the screw 43 when said screw, after the valve has been actuated from an open position into its closed position, has been lowered into contact with said arm. It will be observed, therefore, that the lug 62 is arranged between the screw 43 and the chamber 17 when said screw is in the position in which it has said contact with the shaft-arm 45, and that in said position of said screw said lug overlaps the chamber-facing side of the screw so that, in said position of the screw said lug and said arm are arranged to cooperate in preventing movement of said arm toward the right-hand end of the shaft were the pin 46 removed or missing.

What I claim is:—

1. A faucet comprising a casing having an interior chamber which has a fluid-inlet and a fluid-outlet, a valve arranged to control communication through said outlet, a shaft supported from the casing, means whereby movement of the valve from its closed position into an open position occurs during rotation of the shaft in one direction and rotation of the shaft in the opposite direction occurs during movement of the valve into its closed position, said shaft having an arm adapted to be employed in holding the shaft against rotation in the first-mentioned direction in the closed position of the valve, and a screw which is screwed into the casing and arranged to be moved endwise into pressure-exerting relation to said arm by the required rotation of said screw after movement of the valve from an open position into its closed position, said screw and said arm being arranged to cooperate in causing the valve to be held tightly closed when said screw is in said pressure-exerting relation to said arm.

2. A faucet comprising a casing having an interior chamber which has a fluid-inlet and a fluid-outlet, a valve arranged to control communication through said outlet, a shaft supported from the casing and having an arm externally of the casing, means whereby movement of the valve from its closed position into an open position occurs during rotation of the shaft in one direction and rotation of the shaft in the opposite direction occurs during movement of the valve into its closed position, and a screw arranged externally of the aforesaid chamber and screwed into the casing and arranged to be moved endwise into contact with the aforesaid arm by the required rotation of said screw after movement of the valve from an open position into its closed position, said screw and said arm being arranged to cooperate in preventing rotation of the shaft in the direction required to open the valve after movement of the screw into said contact with said arm.

3. A faucet comprising a casing which has an interior chamber having a fluid-inlet and a fluid-outlet and comprises a member which has a screw-threaded hole extending therethrough, a correspondingly threaded screw engaging said hole, a shaft supported from the casing, a valve arranged to control communication through the aforesaid outlet, and means whereby movement of the valve from its closed position into an open position occurs during rotation of the shaft in one direction and rotation of the shaft in the opposite direction occurs during movement of the valve into its closed position, said shaft having an arm extending under and opposite the inner end of the aforesaid screw in the closed position of the valve, said screw being adapted to be moved endwise into pressure-exerting relation to said arm by the required rotation of the screw after movement of the valve from an open position into its closed position, and said screw and said arm being arranged to cooperate in causing the valve to be held tightly closed when said screw is in said relation to said arm.

4. A faucet comprising a casing which has an interior chamber having a fluid-inlet and a fluid-outlet and comprises an upright internal screw arranged externally of said chamber, an external screw engaging with said internal screw, and a shaft supported from the casing, a valve arranged to control communication through the aforesaid outlet, and means whereby movement of the valve from its closed position into an open position occurs during rotation of the shaft in one direction and rotation of the shaft in the opposite direction occurs during movement of the valve into its closed position, said shaft having an arm extending under and spaced from the aforesaid internal screw in the closed position of the valve, the aforesaid external screw being arranged to be moved endwise into contact with said arm by the required rotation thereof after movement of the valve from an open position into its closed position, and said external screw and said arm being arranged to cooperate in preventing rotation of the shaft in the direction required to open the valve after movement of said screw into said contact with said arm.

5. A faucet comprising a casing having an interior chamber which has a fluid-inlet and a fluid-outlet, a valve arranged to control communication through said outlet, a substantially horizontal shaft supported from the casing, means whereby movement of the valve from its closed position into an open position occurs during rotation of the shaft in one direction and rotation of the shaft in the opposite direction occurs during movement of the valve into its closed position, and an upright screw arranged at one side and externally of the aforesaid chamber and having a threaded connection with and supported from the casing, the aforesaid shaft having an arm extending under the screw in the closed position of the valve, said screw being arranged to be lowered into contact with said arm by the required rotation of the screw after movement of the valve from an open position into its closed position, and said arm and said screw being arranged to cooperate in preventing rotation of the shaft in the direction required to open the valve when the screw has been lowered into said contact with said arm.

6. A faucet comprising a casing having an interior chamber which has a fluid-inlet at the rear and a fluid-outlet at its lower end, a valve arranged to control communication through said outlet, a substantially horizontal shaft arranged lower than said chamber at the rear portion of the casing and extending from side to side of and supported from the casing, means whereby movement of the valve from its closed position into an open position occurs during rotation of the shaft in one direction and rotation of the shaft in the opposite direction occurs during movement of the valve into its closed position, said shaft being provided at one side of the casing and externally of the aforesaid chamber with an arm projecting forwardly in the closed position of the valve, and an upright screw threaded into the casing above and forward of the axis of the shaft and arranged to be moved endwise into contact with said arm by the required rotation of the screw after movement of the valve from an open position into its closed position, said screw and said arm being arranged to cooperate in preventing rotation of the shaft in the direction required to open the valve after movement of the screw into said contact with said arm.

7. A faucet comprising a casing having an interior chamber which has a fluid-inlet and a fluid-outlet, a valve arranged to control communication through said outlet, a shaft supported from the casing, means whereby movement of the valve from its closed position into an open position occurs during rotation of the shaft in one direction and rotation of the shaft in the opposite direction occurs during movement of the valve into its closed position, said shaft having an arm adapted to be employed in holding the shaft against rotation in the first-mentioned direction in the closed position of the valve, and a member supported from the casing and movable into and adapted to be held in pressure-exerting relation to said arm after movement of the valve from an open position into its closed position and, in its pressure-exerting relation to said arm, being arranged to cooperate with said arm in causing the valve to be held tightly closed.

8. A faucet comprising a casing having an interior chamber which has a fluid-inlet and a fluid-outlet, a valve arranged to control communication through said outlet, a shaft arranged at the rear portion of and supported from the casing, means whereby movement of the valve from its closed position into an open position occurs during rotation of the shaft in one direction and rotation of the shaft in the opposite direction occurs during movement of the valve into its closed position, said shaft having an arm which projects forwardly in the closed position of the valve and is arranged to swing upwardly and rearwardly during rotation of the shaft in the first-mentioned direction, and a member supported from the casing and movable over and into pressure-exerting relation to said arm after movement of the valve from an open position into its closed position and, in its pressure-exerting relation to said arm, being arranged to cooperate with said arm in holding the valve closed.

9. A faucet comprising a casing having an interior chamber which has a fluid-inlet and a fluid-outlet, a valve arranged to control communication through said outlet, a shaft supported from the casing, means whereby movement of the valve from its closed position into an open position occurs during rotation of the shaft in one direction and rotation of the shaft in the opposite direction occurs when the valve is being closed, an upright screw arranged externally of the aforesaid chamber and having threaded connection with the casing, the aforesaid shaft having an arm extending under said screw in the closed position of the valve, said screw being arranged to be lowered into pressure-exerting relation to said arm by the required rotation of the screw after closing of the valve and to cooperate with said arm in causing the valve to be tightly closed when the screw is in said relation to said arm, and an apron rigid with the casing and arranged below the aforesaid connection of said screw with the casing and externally of the paths of said screw and said arm, said apron being arranged to extend circumferentially of the lower portion of said screw in the pressure-exerting relation of the screw to said arm.

10. A faucet comprising a casing which has an interior chamber having a fluid-inlet and a fluid-outlet and comprises a lug arranged at one side and externally of the casing, a valve arranged to control communication through said outlet, an upright screw threaded into and extending through the aforesaid lug, a shaft extending from side to side of and supported from the casing and having an arm extending under said screw in the closed position of the valve, means whereby movement of the valve from its closed position into an open position occurs during rotation of the shaft in one direction and rotation of the shaft in the opposite direction occurs when the valve is being closed, the aforesaid screw being arranged to be lowered into pressure-exerting relation to the aforesaid arm by the required rotation of the screw after closing of the valve and to cooperate with said arm in causing the valve to be tightly closed when the screw is in said relation to said arm, and an apron rigid with the casing and arranged externally of the paths of said arm and said screw and also arranged to extend circumferentially of the lower portion of said screw in said relation of the screw to said arm, said apron extending downwardly from the aforesaid lug.

11. A faucet comprising a casing which has an interior chamber having a fluid-inlet and a fluid-outlet and comprises a laterally projecting external lug, a screw threaded into and extending through said lug, a valve arranged to control communication through the aforesaid outlet, a shaft supported from the casing and having an arm extending under the aforesaid screw in the closed position of the valve, and means whereby movement of the valve from its closed position into an open position occurs during rotation of the shaft in one direction and rotation of the shaft in the opposite direction occurs when the valve is being closed, the aforesaid screw being arranged to be moved into pressure-exerting relation to the aforesaid arm during the required rotation of the screw after closing of the valve and to cooperate with said arm in causing the valve to be held closed when the screw is in said relation to said arm, the screw extending below said lug in its uppermost position and under said lug having a shoulder arranged to cooperate with the lower end face of the lug in limiting upward movement of the screw.

12. A faucet comprising a casing which has an interior chamber having a fluid-inlet and a fluid-outlet and comprises a laterally projecting external lug, an upright screw extending in any position thereof through and threaded into said lug, a pin carried by and extending transversely of said screw and arranged below said lug in the uppermost position of the screw, a valve arranged to control communication through the aforesaid outlet, a shaft supported from the casing and having an arm extending under the aforesaid screw in the closed position of the valve, and means whereby movement of the valve from its closed position into an open position occurs during rotation of the shaft in one direction and rotation of the shaft in the opposite direction occurs when the valve is being closed, the aforesaid screw being arranged to be lowered into pressure-exerting relation to the aforesaid arm during the required rotation of the screw after closing of the valve, said screw and said arm being arranged to cooperate in holding the valve closed when the screw is in said pressure-exerting relation to said arm, and one end of the aforesaid pin extending opposite the lower end face of the aforesaid lug.

13. A faucet comprising a casing having an interior chamber which has a fluid-inlet and a fluid-outlet, a valve arranged to control communication through said outlet, means acting to retain the valve in its closed position, a shaft supported from the casing, means whereby movement of the valve from its closed position into an open position occurs during the required rotation of the shaft in one direction and rotation of the shaft in the opposite direction occurs when the valve is being closed, said shaft having an arm adapted to be employed in holding the shaft against rotation in the second-mentioned direction after movement of the valve into said open position, and a member supported from the casing and movable, after opening of the valve, into a position in which it is arranged to cooperate with said arm in preventing rotation of the shaft in said second-mentioned direction.

14. A faucet comprising a casing having an interior chamber which has a fluid-inlet and a fluid-outlet, a valve arranged to control communication through said outlet, means acting to retain the valve in its closed position, a substantially horizontal shaft extending from side to side of and supported from the casing, means whereby opening of the valve occurs during the rotation of the shaft in one direction and rotation of the shaft in the opposite direction occurs when the valve is being closed, said shaft having an arm which projects forwardly in the closed position of the valve and is arranged to swing upwardly and rearwardly during rotation of the shaft in the first-mentioned direction, and a member supported from the casing and movable, after said arm has swung upwardly and rearwardly during said rotation of the shaft in said first-mentioned direction, into a position in which it extends in front of said arm and is arranged to prevent rotation of the shaft in the second-mentioned direction.

15. A faucet comprising a casing having an interior chamber which has a fluid-inlet and a fluid-outlet, a valve arranged to control communication through said outlet, means acting to retain the valve in its closed position, a shaft supported from the casing, means whereby opening of the valve occurs during rotation of the shaft in one direction and rotation of the shaft in the opposite direction occurs when the valve is being closed, said shaft having an arm adapted to be employed in holding the shaft against rotation in the second-mentioned direction after said opening of the valve, and a screw threaded into the casing and arranged to be moved endwise, by the required rotation thereof after the aforesaid opening of the valve, into a position in which said screw is arranged to cooperate with the aforesaid arm in holding the shaft against rotation in said second-mentioned direction.

16. A faucet comprising a casing having an interior chamber which has a fluid-inlet and a fluid-outlet, a valve arranged to control communication through said outlet, a shaft supported from the casing and having an arm, means whereby movement of the valve from its closed position into an open position occurs during rotation of the shaft in one direction and rotation of the shaft in the opposite direction occurs when the valve is being closed, and a member supported from the casing and capable of movement, after the second-mentioned rotation of the shaft, into a position in which it engages said arm and is arranged to cooperate with the arm in holding the shaft against rotation in the first-mentioned direction, said arm-engageable member, when it has been withdrawn from said position to permit rotation of the shaft in said first-mentioned direction, being movable, after said rotation of the shaft in said first-mentioned direction, into a position in which said arm-engageable member and said arm are arranged to cooperate in holding the shaft against rotation in the second-mentioned direction.

17. A faucet comprising a casing having an interior chamber which has a fluid-inlet and a fluid-outlet, a valve arranged to control communication through said outlet, a shaft supported from the casing and having an arm, means whereby movement of the valve into an open position occurs during rotation of the shaft in one direction and rotation of the shaft in the opposite direction occurs when the valve is being closed, and a screw having threaded connection with the casing and arranged to be moved into pressure-exerting relation to the aforesaid arm by the required rotation of said screw in one direction after closing of the valve and disposed to cooperate with said arm in holding the valve closed when said screw is in said relation to said arm, said screw being withdrawable, by the required rotation of the screw in the opposite direction, from said arm the distance necessary to permit rotation of the shaft in the first-mentioned direction and to bring said arm into a position permitting movement of the withdrawn screw into a position in which said screw and said arm are arranged to cooperate in preventing rotation of the shaft in the second-mentioned direction.

18. A faucet comprising a casing having an interior chamber which has a fluid-inlet and a fluid-outlet, a valve arranged to control communication through said outlet, a substantially horizontal shaft having an arm, means whereby movement of the valve into an open position occurs during rotation of the shaft in one direction and rotation of the shaft in the opposite direction occurs when the valve is being closed, and an upright screw which is threaded into the casing and arranged to be lowered into pressure-exerting relation to the aforesaid arm by the required rotation of said screw in one direction after closing of the valve and disposed to cooperate with said arm in holding the valve closed during said relation of said screw with said arm and raisable by the required rotation of the screw in the opposite direction out of said relation to said arm and far enough to permit rotation of the shaft in the first-mentioned direction and to bring the arm into a position permitting lowering of the raised screw into a position in which said screw and said arm are arranged to cooperate in preventing rotation of the shaft in the second-mentioned direction.

19. A faucet comprising a casing having an interior chamber which has a fluid-inlet and a fluid-outlet, a valve arranged to control communication through said outlet, a shaft supported from the casing and having an arm externally of the casing, means whereby movement of the valve from its closed position into an open position occurs during rotation of the shaft in one direction and rotation of the shaft in the opposite direction occurs during movement of the valve into its closed position, a screw arranged externally of the aforesaid chamber and threaded into the casing and arranged to be moved endwise into contact with the aforesaid arm by the required rotation of the screw after closing of the valve, said screw and said arm being arranged to cooperate in preventing rotation of the shaft in the direction required to open the valve after movement of the screw into said contact with said arm, and means whereby said screw, when the screw is in said contact with said arm, may be locked against rotation in the direction required to withdraw the screw from said arm.

20. A faucet comprising a casing having an interior chamber which has a fluid-inlet and a fluid-outlet, a valve arranged to control communication through said outlet, a shaft supported from the casing and having an arm externally of the casing, means whereby movement of the valve into an open position occurs during rotation of the shaft in one direction and rotation of the shaft in the opposite direction occurs when the valve is being closed, and a screw arranged externally of the aforesaid chamber and threaded into the casing and arranged to be moved endwise into pressure-exerting relation to the aforesaid arm during the required rotation of the screw after closing the valve, said screw and said arm being arranged to cooperate in holding the shaft against rotation in the first-mentioned direction when said screw is in said pressure-exerting relation to said arm, said arm having a lug arranged between said screw and the aforesaid chamber in said relation of said screw to said arm, and said lug overlapping the chamber-facing side of said screw in said relation of the screw to said arm.

21. A faucet comprising a casing which has an interior chamber having a fluid-inlet and a fluid-outlet and comprises an external lug arranged at one side of the casing and having a flange, a valve arranged to control communication through said outlet, an upright screw extending through and threaded into the aforesaid lug and having a head which is arranged above said lug in any position of the screw and has a series of holes spaced from and circumferentially of the axis of the screw, a shaft supported from the casing and having an arm extending under said screw in the closed position of the valve, means whereby opening of the valve occurs during rotation of the shaft in one direction and rotation of the shaft in the opposite direction occurs when the valve is being closed, the aforesaid screw being arranged to be lowered into pressure-exerting relation to said arm during the required rotation of the screw after closing the valve and to cooperate with said arm in holding the valve closed in said relation of the screw to said arm, and one of the aforesaid holes, in said relation of said screw to said arm, being arranged to receive the bow of a padlock in position to cooperate with the aforesaid flange in locking said screw against rotation in the direction required to withdraw the screw from said arm.

In testimony whereof, I sign the foregoing specification.

JOSEPH A. COSTELLO.